United States Patent [19]

Elgal et al.

[11] 4,246,031

[45] Jan. 20, 1981

[54] PREPOLYMER PREPARATION AND POLYMERIZATION OF FLAME RETARDANT CHEMICALS FROM THP-SALTS

[75] Inventors: Galoust M. Elgal, Metairie, La.; Rita M. Perkins, Gaithersburg, Md.; Nestor B. Knoepfler, New Orleans, La.

[73] Assignee: The United States of America as represented by the Secretary of Agriculture, Washington, D.C.

[21] Appl. No.: 950,493

[22] Filed: Oct. 11, 1978

[51] Int. Cl.³ .................................................. C09D 5/18
[52] U.S. Cl. .................................. 106/18.14; 8/116 P; 106/18.15; 106/18.18; 252/8.1; 427/341; 427/393.3
[58] Field of Search ............... 106/18.14, 18.15, 18.18; 8/116 P; 260/606.5 F; 427/341, 390 D, 393.3; 252/8.1

[56] References Cited

U.S. PATENT DOCUMENTS

| 3,310,420 | 3/1967 | Wagner | 117/62.2 |
|---|---|---|---|
| 3,607,356 | 9/1971 | Beninate et al. | 428/272 |
| 3,645,936 | 2/1972 | Gardner | 264/191 |
| 3,784,356 | 1/1974 | Wagner | 8/196 |
| 3,846,155 | 11/1974 | Wagner | 117/62.2 |

OTHER PUBLICATIONS

Elgal et al., "Prepolymer Preparation and Polymerization of Flame Retardant Chemicals in Cotton", ACS Symposium Series, No. 58, 10/77, pp. 249-260.

*Primary Examiner*—Lorenzo B. Hayes
*Attorney, Agent, or Firm*—M. Howard Silverstein; David G. McConnell; Raymond C. Von Bodungen

[57] ABSTRACT

A flame retardant prepolymer composition for imparting flame retardance to cotton, cellulosic textiles, and certain other materials; the process for preparing the prepolymer composition; and the application technique of said prepolymer composition are disclosed. Tetrakis(hydroxymethyl)phosphonium sulfate, a THP salt, is acidified, ammonia gas is bubbled into the mixture to achieve a constant boiling, these steps are repeated a number of times, and the prepolymer mixture thus prepared is then applied to a substrate, followed by treatment with a caustic solution.

8 Claims, No Drawings

PREPOLYMER PREPARATION AND POLYMERIZATION OF FLAME RETARDANT CHEMICALS FROM THP-SALTS

BACKGROUND OF THE INVENTION

1. Field of the Invention

This invention relates to a flame retarding prepolymer composition, and to its method of preparation and application. A tetrakis(hydroxymethyl)phosphonium salt is the main ingredient.

2. Description of the Prior Art.

Currently investigative efforts dealing with the matter of conservation of energy and that of the minimizing pollution in all fields indicate that both the textile industry and the United States Department of Agriculture have likewise been concerned. Flame retardant finishes for cotton, for textiles, and for all other flammable materials have been investigated substantially. The cotton textile literature indicates that flame retardant finishes must be very carefully evaluated before the finished product reaches the consumer because of their potential hazards to humans, to plants and to animals, directly or indirectly.

Textile finishes available for meeting current government flammability regulations for cotton are generally based on only three flame retarding compounds. These chemicals are the condensate of bis(betachloroethyl)vinyl phosphonate and alkyl phosphonate, N-methylol dimethyl phosphonopropionamide, and tetrakis(hydroxymethyl)phosphonium salts, generally known as THP salts. Children's sleepwear cotton flannelette has been in the past finished with the THP salt or a condensation product by an ammonia gas cure. The ammonia gas cure has been preferred because the finished fabric generally has had relatively high strength and a soft hand. There have been problems with this process, among which is the release of unpleasant and irritating gases and the design of the gaseous reactor for production scale operations.

U.S. Pat. No. 3,607,356, in the prior art, discloses steps for imparting flame retardance to cellulosic fabric by the process of applying the THP salt to the substrate and then employing ammonia gas to cause its polymerization in the substrate. Among the problems encountered here is the lack of a uniform application on fabrics, ammoniation reactor design difficulties, pollution resulting from the release of gases from the reactor, such as ammonia and formaldehyde, which are irritating and toxic. Apart from textiles it has been determined that THP salts combined with an ammonia gas cure have not been adaptable to substrates such as structural members generally employed in construction of buildings.

U.S. Pat. No. 3,310,420 deals with numerous variations of flame retardant treatments; however the section which closely relates to the instant invention uses ammonia cure, as does the cited U.S. Pat. No. 3,607,356, and is encumbered by the same problems.

U.S. Pat. No. 3,846,155 deals with the apparatus of the ammonia cure process of the cited U.S. Pat. No. 3,607,356. Obviously the same problems are present.

U.S. Pat. No. 3,784,356 deals with the same concept of the THP and ammonia cure but the known process is improved by providing a liquid cure instead of a gaseous ammonia cure, thus removing the need for an ammonia reactor. The liquid ammonia cure employs anhydrous ammonia and urea. The initial step of applying the THP still required heat drying and does not at this stage contain all of the ingredients of phosphorus, methyl, and amine groups to form the flame retardant polymer, i.e., it is not a prepolymer.

SUMMARY OF THE INVENTION

A prepolymer chemical composition is prepared by mixing a known THP salt with an acidifying agent to adjust the pH, then introducing ammonia gas into the mixture until a chemical reaction is manifested by a constant-boiling mixture. The mixture is then quickly cooled, the introduction of ammonia repeated a plurality of times sufficient to form a water insoluble precipitate when the pH of the mixture is raised to at least 8. A phosphorus-nitrogen prepolymer composition is obtained which has the advantage of not requiring application of heat to obtain polymerization once it is in or on the preferred substrate.

The main object of this invention is to provide a wet chemical process which is useful in imparting flame retardance to cotton and other cellulosic materials as well as non-cellulosics, a process which is operable with a minimum of energy consumption. The object is achieved and surpassed in that no heat is required in the application of the prepolymer. A more concentrated mixture can be obtained by a supplementary step of the invention, when a more demanding performance is required.

DESCRIPTION OF THE PREFERRED EMBODIMENTS

The preferred ingredients of the prepolymer composition of this invention comprise a quantity of tetrakis(hydroxymethyl)phosphonium sulfate acidified with a quantity of acidifying agent, until a pH of less than 4 is attained. This acidified mixture is preheated to about 60° C., and ammonia gas is then introduced into the mixture, preferably by bubbling the gas into the liquid mixture. The ammonia gas must flow into the mixture continuously though slowly until there occurs and exothermic reaction, as indicated by bubbling which then proceeds without further addition of gas. When this point is reached the mixture is then quickly cooled preferably to near-ambinet temperature. At this first boiling point the temperature is 85° C. However, it is suitable to reduce the temperature to a point below the boiling point.

A second introduction of ammonia gas into the mixture is then initiated, with occasional stirring of the mixture. This is continued until the boiling point is reached, this time at about 80° C. Again here, when the bubbling becomes continuous, the mixture is quickly cooled to near-ambient temperature.

A third introduction of ammonia gas into the mixture is then initiated, with occasional stirring, as before. The boiling point is reached this time at about 75° C. The bubbling is arrested as before, and a fourth introduction of ammonia gas is initiated, repeating all steps as before. The temperature reached at this time is about 70° C. It is this mixture which is the preferred prepolymer chemical composition of the present invention. The composition has a viscosity of about from 1100 to 2800 centipoises, a nitrogen content of about from 3.1% to 5.9%, a phosphorus content of about from 4% to 14%, and a pH of about from 1 to 4. It has been found that less ammonium gas is necessary if the acidifying aqueous solution of THP salt contained an ammonium salt buffering agent, such as ammonium sulfate, ammonium chloride, and dibasic ammonium phosphate in proportion sufficient to buffer the solution to pH of less than 4.

It has also been found that the desired prepolymer can be formed without the use of ammonia gas or acidifying agents. An aqueous solution of THP salt which is one-half saturated with an ammonium salt, such as one of those described above, is heated to about the boiling point for a period of time sufficient to form a water insoluble precipitate when the pH of the solution is raised to at least 8. The boiling point of these solutions can vary from 65° C. to 85° C., depending on the salt concentration. The solutions before heating are slightly cloudy, but as the reaction proceeds the solution will clear. Suitable heating times range from 1 to 3 minutes. Excessive heating time cause discoloration of any of these solutions, indicating decomposition of the product.

In those instances when a maximum performance is required of the prepolymer chemical composition of this invention the following steps must be taken. The composition is acidified to obtain a pH less than 4. A quantity of pulverized tetrakis(hydroxymethyl)phosphonium polymer, up to a maximum preferred 40% by weight of the sulfate, with constant stirring, preheating to about a preferred 60° C., and then a quantity of ammonia gas is introduced thereinto until a constant bubbling exothermic reaction is reached. The mixture is then quickly cooled to near-ambient temperature.

The aqueous solution of tetrakis(hydroxymethyl)phosphonium salt can be acidified to a pH less than 4 with a suitable acid, preferably phosphoric acid.

As indicated in the detailed description of "Prepolymer Preparation and Polymerization of Flame REtardant Chemicals in Cotton" by Elgas, Perkins, and Knoepfler, found in the ACS Symposium Series No. 58 of the American Chemical Society (1977), three cycles are normally sufficient to produce the desired prepolymer solution. Pages 253–254 teach a manner for determining the completeness of the prepolymer formation. It is explained there that upon addition of base "a good prepolymer will flocculate and form a solid mass of white polymer . . . " while if the solution for testing turns milky and foams upon addition of base, the prepolymer preparation is incomplete.

Tetrakis(hydroxymethyl)phosphonium sulfate has been used to illustrate the preferred THP salt of this invention; however, it should be noted that other THP Salts could be substituted, with certain necessary adjustments, such as, for example, if tetrakis(hydroxymethyl)phosphonium chloride is employed as the flame retardant it might be necessary to employ ammonium chloride. In that case, a different set of parameters may be applicable. In order to obtain flame retarding amounts of polymer on cellulosic materials, the preferred wet pickup of THPS ranges from as low as about 82% to as high as about 238%.

Preferred concentrations of alkali, which reacts with the prepolymer to form the water insoluble polymer within the fibers of the cellulosic material range from as low as 8% to as high as 50%, at temperatures of about 4° to 10° C., to a preferred wet pickup of alkali of about from 110% to 170%. Any suitable alkali may be used, such as sodium or potassium hydroxide.

In the preferred embodiments of the present invention the valence of the phosphorus in the polymerized application is changed from three to five by applying a dilute solution of an oxidizing agent, preferably hydrogen peroxide of a concentration of about from 1% to 6%, and of course, the treatment is followed with a water wash and drying which is standard in all wet processing of textiles.

The following examples are provided for illustrating the preferred embodiments of the invention and should not be construed as limiting the invention in any manner whatever.

EXAMPLE 1

A quantity of 100 grams of aqueous tetrakis(hydroxymethyl)phosphonium sulfate solution, THPS, was mixed with 24 grams of an aqueous phosphoric acid solution, stirred, and then heated to 60° C. The THPS was of 75% concentration, and the acid was of 85% concentration.

Ammonia gas was bubbled into the preheated mixture while stirring the mixture. Exothermic reaction caused the temperature to rise to a constant boiling point of about 85° C. The mixture was then immediately cooled by plunging the vessel which contained the mixture into an ice bath. The vessel was kept immersed in the cooling bath until the temperature of about 75° C. was reached, then the vessel was removed from the ice bath.

Ammonia gas was again bubbled into the mixture, as before. The boiling point this time as achieved at a temperature of about 80° C. The cooling of the vessel and contents was done as before, until a temperature of the mixture of about 70° C. was reached, then the vessel was removed from the cooling environment.

The ammoniation of the mixture was repeated, as before, and the boiling point achieved at about 75° C.; the vessel was again cooled in the ice bath, to a temperature of about 65° C., this time, and the ammonia gas was bubbled into the mixture a fourth time. The final boiling was achieved at a temperature of about 70° C., and the mixture was cooled again until room temperature (about 25° C.) was reached.

The mixture—the prepolymer composition of this invention—is not considered acceptable until the product is subjected to a quality control test.

Quality Control of the Prepolymer Composition

To determine the completeness of the prepolymer formation, therefore the acceptability of the mixture prepared, it has been a practice by the present inventors to subject the mixture to a test consisting of the following steps:

(a) Placing 5 milliliters of the mixture in a test tube, (b) adding to the tube 3 to 5 milliliters of aqueous (25% concentration) sodium hydroxide, and (c) stirring the mixture.

To evaluate the product it must be understood that if a flocculate is formed and a solid mass which can be rinsed without dissolving, to yield a white polymer, the mixture is considered to be *good*. If, on the other hand, the test yields a milky mixture, which foams upon addition of the base, this is a manifestation that additional ammonia is needed, and the mixture is considered to be *incomplete*, or not good.

With reference to the storage of the prepolymer composition of the invention, it is recommended that the composition be stored in a refrigerated environment at about 10° C. Composition mixtures which have been stored as long as 18 months at this temperature have been found usable after that length of storage.

EXAMPLE 2

The steps of Example 1 were repeated in the preparation of a prepolymer composition but 15 grams of dibasic ammonium phosphate was added to the composition of Example 1, causing a reduction of the amount of ammonia gas required. The same temperature as in Example 1 were observed throughout the processing in this investigation. The prepolymer composition was subjected to the quality control indicated in Example 1 and found *good*.

EXAMPLE 3

The steps of Example 1 were repeated in the preparation of a prepolymer composition but 15 grams of ammonium sulfate was added to the composition of Example 1, causing a reduction of the amount of ammonia gas required. The prepolymer composition was subjected to the quality control test and found *good*.

EXAMPLE 4

A quantity of 100 grams of aqueous THPS solution was mixed with 24 grams of an aqueous dibasic ammonium phosphate, stirred, and then heated to 70° C. and held at this temperature for 2 minutes, then cooled in an ice bath to room temperature (ca. 25° C.). The use of dibasic ammonium phosphate precludes the need of ammonia as a gas. The prepolymer composition thus prepared was subjected to the quality control test and found *good*.

EXAMPLE 5

The composition of Example 4 was prepared again but 24 grams of ammonium sulfate were employed instead of the dibasic ammonium phosphate. The composition was tested and found *good*.

EXAMPLE 6

Dibasic ammonium phosphate was mixed with ammonium sulfate in the preparation of Example 4; however a quantity of 15 grams of each was employed, all other steps repeated, and the composition thus prepared was then subjected to the quality control test and found *good*.

EXAMPLE 7

For a more demanding flame retardance performance a more concentrated prepolymer composition was prepared. To a 100 gram quantity of THPS (75% conc.) solution a quantity of 24 grams of phosphoric acid (85% conc.) was added, and to that mixture 40 grams of THP polymer was further added. (See Example 1 for the preparation of the polymer). The aqueous mixture was preheated to about 60° C. and ammoniated by alternately heating and cooling, as in Example 1. The composition was subjected to the quality control test and found to be *good*.

EXAMPLE 8

At this writing there is no preferred composition from those in Examples 1 through 7 for the treatment of cotton fabrics, since all applications thus far have yielded no significant differences. Applications to flannelette cloth were subjected to the Flammable Fabric Act Test, otherwise known as the "Vertical Flame Test", and all samples passed the test. (Ref. DOC FF3-71, Federal Register, 36, No. 146, July 29, 1971.) For purposes of illustrating how this testing is generally performed a small batch comprising six samples is presented as evaluated.

Durablity of FR Treatment in Laundering

A small batch of six samples of cotton flannelette cloth, (36 cm × 36 cm each) was padded the prepolymer composition of Example 2 and attaining wet pickups of 198% to 225%, using a standard dip-and-squeeze roll (twice) technique. The composition was supplemented with a minute quantity of wetting agent, an aliphatic polyether. The wet impreganted cloth was then dipped into a 25% sodium hydroxide solution and kept immersed for 60 seconds, the solution being at a temperature of about 5° to 10° C., followed by removal of excess caustic solution by passing the impregnated cloth through squeeze rolls to attain a wet pickup of about 110% to 170%. The wet impregnated fabric was then oxidized in a 1% hydrogen peroxide bath for 5 minutes, and all samples allowed to dry.

The six samples were then submitted to 50 standard Launderings, that is, 50 cycles of laundering, and allowed to dry. To determine if the flame retardant treatment withstood the laundering all samples were then tested by the DOC Flame Test. All samples passed the test, as indicated by the burn lengths which ranged from 1.20 to 4.2 inches. The DOC maximum tolerance in an allowable 7 inches. (See Table I)

Experience indicated that a final dry add-on of a maximum of 40% and a minimum of 17%, depending on the quality of the product desired, is the recommended range for cotton fabric applications.

TABLE I

FLANNELETTE CLOTH EVALUATION - After 50 Laundering Cycles

| Sample | Add-on % | Phosphorus, % | Nitrogen % | N:P Mole Ratio | DOC Vertical Flame Test - Burn Length, Inches |
|---|---|---|---|---|---|
| 1 | 32.6 | 6.55 | 2.27 | 0.8 | 1.2 |
| 2 | 30.8 | 5.81 | 2.11 | 0.8 | 1.4 |
| 3 | 30.8 | 5.23 | 1.94 | 0.8 | 3.3 |
| 4 | 35.9 | 6.38 | 2.64 | 0.9 | 1.4 |
| 5 | 36.6 | 5.61 | 2.55 | 1.0 | 4.2 |
| 6 | 36.2 | 5.75 | 2.47 | 1.0 | 1.0 |

EXAMPLE 9

Application of the Composition to Curled Shreds of Wood (Excelsior)

Investigative work included the treatment of curled shreds of wood otherwise referred to a "Excelsior". The prepolymer composition of Example 2 was applied to the excelsior with success.

A quantity of about 150 grams of excelsior was sprayed lightly but covering all surfaces well, with the prepolymer composition of Example 2, and allowed to dry. Promptly thereafter an equal application of a 25% aqueous solution of sodium hydroxide was sprayed over the prepolymer application, and the treatment was permitted to dry. Both the treated and some untreated portions of the chips were placed into a blue flame from a Bunsen Burner for an equal period of time. The untreated wood ignited and became ash. The treated wood merely charred.

EXAMPLE 10

Application of the Composition to a two-by-four Stud (Wood)

Investigative work with respect to the applicability of the composition of the invention was extended to board lumber which is commonly employed in construction of residential houses. In one of these treatments a two-by-four stud (pine wood), precisely 9 cm×3 ½ cm×35 cm, was treated on the one side with a hand-brushed prepolymer application, using the composition of Example 7. The coating was allowed to permeate into the wood, and a second coating applied shortly thereafter. Then a 25% sodium hydroxide solution was sprayed on the already applied prepolymer surface. This was allowed to react for about 60 seconds, and repeated once more. The application was then allowed to air dry at room temperature.

To evaluate the treatment on the stud for flame retardance it was held at a 45° angle and a Bunsen Burner placed under it. A blue flame was made to come in contact with the treated surface, and the flame held there for exactly 10 minutes. Combustion of the surface did *not* take place but the polymer was charred. For comparative purposes the evaluation was then performed on the untreated side of the same stud. Within the same period of time the wood was ignited and continued burning until the flame was extinguished.

We claim:

1. A process for preparing prepolymer chemical compositions which are useful for imparting flame retardance to cellulosic material comprising:
   (a) preparing aqueous solution of a tetrakis(hydroxymethyl)phosphonium salt, said solution having a pH of less than 4;
   (b) bubbling ammonia gas through said aqueous solution until an exothermic reaction between said THP salt and said ammonia gas increases the temperature of said aqueous solution to a constant boiling point;
   (c) cooling the reaction mixture resulting from step (b) to below said boiling point; and
   (d) repeating steps (b) and (c) a plurality of times sufficient to form a water soluble precipitate when the pH of the produce of step (c) is raised to a pH of at least 8.

2. The process of claim 1 wherein the aqueous solution of step (a) further contains an ammonium salt as a buffering agent.

3. The prepolymer chemical composition prepared by the process of claim 1.

4. The prepolymer chemical composition prepared by the process of claim 2.

5. A process for imparting flame retardance to cellulosic materials, the process comprising:
   (a) impregnating cellulosic material with a flame retarding amount of the prepolymer chemical composition of claim 3,
   (b) reacting said prepolymer with alkali to form a phosphorus containing water insoluble polymer (precipitate) on the fiber of said cellulosic materials, and
   (c) oxidizing said water-insoluble precipitate with an oxidizing agent to change the valence of said phosphorus from 3 to 5.

6. A process for preparing a prepolymer chemical composition which is useful for imparting flame retardance to cellulosic materials, the process comprising:
   (a) preparing an aqueous soltution of a tetrakis(hydroxymethyl)phosphonium salt and an ammonium salt, and
   (b) heating said solution at about the boiling point for a period of time sufficient to form a water insoluble polymer precipitate when the pH of the product of step (b) is raised to at least 8.

7. The prepolymer chemical composition prepared by the process of claim 6.

8. The flame retardant product obtained by the application of the prepolymer of claim 7 to cellulosic materials.

* * * * *